United States Patent [19]

Kitamura et al.

[11] Patent Number: 5,218,462
[45] Date of Patent: Jun. 8, 1993

[54] IMAGE SENSOR MODULE FOR HANDY-TYPE IMAGE INPUT APPARATUS

[75] Inventors: Koichi Kitamura; Hidenori Mimura; Kazuo Yamamoto; Yasumitsu Ohta, all of Kawasaki, Japan

[73] Assignee: Nippon Steel Corporation, Tokyo, Japan

[21] Appl. No.: 610,923

[22] Filed: Nov. 9, 1990

[30] Foreign Application Priority Data

Nov. 13, 1989 [JP] Japan .................................. 1-294687

[51] Int. Cl.⁵ ............................................. H04N 1/028
[52] U.S. Cl. ..................... 358/473; 358/474; 358/213.11; 382/58
[58] Field of Search ............... 358/400, 474, 473, 401, 358/482, 483, 497, 213.11, 213.13; 382/58

[56] References Cited

U.S. PATENT DOCUMENTS 4,862,281 11/1991 Sato et al. ........................ 358/400

FOREIGN PATENT DOCUMENTS 0169411 1/1986 Japan .
62-126665 6/1987 Japan .

Primary Examiner—Edward L. Coles, Sr.
Assistant Examiner—Jerome Grant, II
Attorney, Agent, or Firm—Steven M. Rabin

[57] ABSTRACT

An image sensor module suitable for use in a handy-type image input apparatus comprises an image sensor device which has connection terminals only on one side and the opposite side of the image sensor device is trued up with an edge portion of a module substrate on which the image sensor device is fixed.

7 Claims, 3 Drawing Sheets

IMAGE SENSOR MODULE FOR HANDY-TYPE IMAGE INPUT APPARATUS

BACKGROUND OF THE INVENTION

1. Field of the Invention

The present invention relates to an image sensor module suitable for use in a handy-type image input apparatus which is held by hand and slid across a document to read out an image of the document.

2. Description of the Related Art

Typically, the image sensor module comprises an image sensor device having a plurality of sensor elements, and a printed circuit board on which the image sensor device and control circuits for the image sensor device are mounted. The sensor elements are arranged in a straight line, and connections between the sensor elements and the control circuits are arranged on both sides of that line, as disclosed, for example, in Japanese Unexamined Patent Publication (Kokai) No. 62-126665.

An image of a document is read out by touching the image sensor to a surface of a document and by sliding the image sensor in a direction perpendicular to the line of sensor elements. Therefore, the image sensor must be placed at an exact position on the document in order to exactly read out a required portion of the document. Nevertheless, it is not easy to exactly place the image sensor at the required position on the document, because there is a certain distance between an edge portion and a sensing portion in the image sensor module because of the existence of the aforementioned connections between the sensor elements and the control circuits.

Additionally, as the distance between the edge portion and the sensing portion is large, it is difficult to read out the center portion of a spread open bulky book or magazine.

Furthermore, the conventional image sensor module has a certain width due to the connections arranged on both sides of the sensor elements, so that exact imaging cannot be performed if the document has an uneven surface or it is bent, because the image sensor cannot be kept in contact with the surface of the document

SUMMARY OF THE INVENTION

It is an object of the present invention to provide an image sensor module for a handy-type image input apparatus, which has a sufficiently short distance between an edge portion and an image sensing portion for the image sensing portion to be exactly placed at a starting position for reading-out a document.

It is another object of the present invention to provide an image sensor module for a handy-type image input apparatus, which has a sufficiently narrow width for a document having an uneven surface or being bent so as to be difficult to be exactly read out.

According to the present invention, there is provided an image sensor module comprising an image sensor device for sensing an image of an object, having a plurality of sensor elements, a control circuit for controlling the sensor elements, a printed circuit board on which the control circuit is mounted, a module substrate on which the image sensor device and the printed circuit board are fixed, and connection means for electrically connecting the sensor elements with the control circuit, wherein the image sensor device has a plurality of connection terminals, through which the sensor elements are electrically connected with the control circuit, only on one side of the image sensor device, and the opposite side of the image sensor device is trued up with an edge portion of the module substrate.

DESCRIPTION OF THE PREFERRED EMBODIMENTS

Figure 1A:
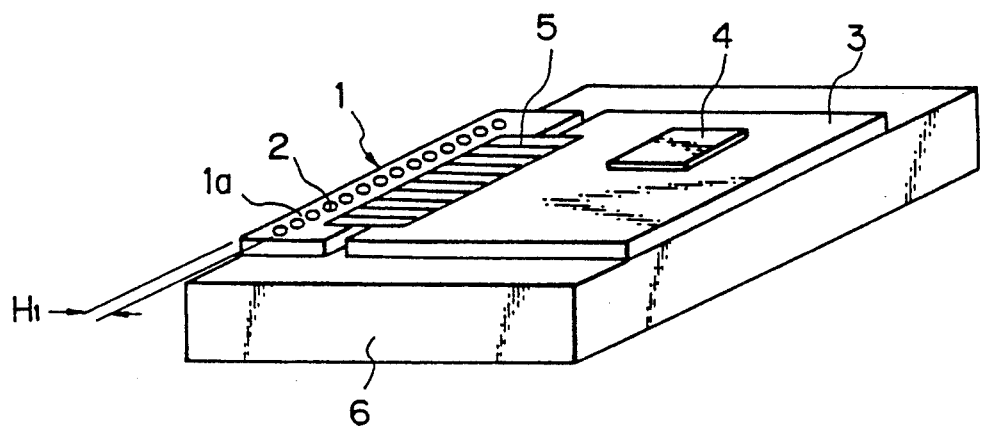
FIG. 1A is a perspective view of an image sensor module according to a first embodiment of the present invention.

FIG. 1A shows a perspective view of an image sensor module according to a first embodiment of the present invention.

The image sensor module comprises an image sensor device 1 having a plurality of sensor elements 2 arranged on a straight line, a printed circuit (PC) board 3 on which an integrated circuit 4 for controlling the image sensor device 1 is mounted, a heat seal connector 5 which electrically connects the sensor elements 2 with the PC board 3, and a module substrate 6 on the same surface of which the image sensor device 1 and the PC board 3 are fixed.

The image sensor device 1 shown in FIG. 1A has a width of about 3 mm and has connection terminals only on one side. Therefore, the image sensor device 1 is connected to the PC board 3 through the heat seal connector 5 on one side and the opposite side of the image sensor device 1 is trued up (flush) with an edge portion of the module substrate 6. Thus, the distance $H_1$ between the edge portion of the module substrate 6 and the sensor elements 2 becomes so much shorter than in the conventional image sensor module that positioning of the image sensor device 1 at a starting position for reading out a document becomes easy.

Additionally, a hollow portion, such as the center portion of a spread open bulky book or magazine, can be easily read out with the image sensor module of the present invention because of the short distance between the edge portion of the sensor module and the sensor elements.

Figure 1B:
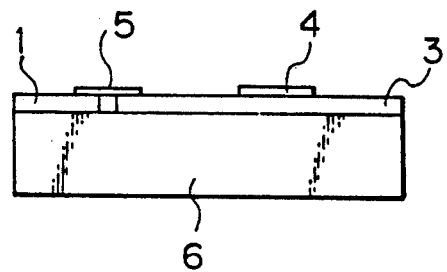
FIG. 1B is a cross-sectional view of an image sensor module shown in FIG. 1A.

FIG. 1B shows a cross-sectional view of the image sensor module shown in FIG. 1A. As shown in FIG. 1B, the image sensor device 1 and the PC board 3 are the same height. Therefore, the heat sensor device 1 and the PC board 3 at the same time.

A transparent substrate 1a (FIG. 1A), on which the sensor elements are formed, tends to be warped when the heat seal connector 5 is bonded by heating. If the warped image sensor device 1 is used together with a focusing lens such as an SLA (SELFOC Lens Array) in an image input apparatus, the distance between the sensor elements and the SLA is varied in a longitudinal direction of the image sensor device 1, so that image information cannot be clearly obtained. In this embodiment of the present invention, however, the aforementioned problem is overcome, since warping of the image sensor device 1 is prevented by firmly fixing the image sensor device 1 on the module substrate 6.

Figure 2A:
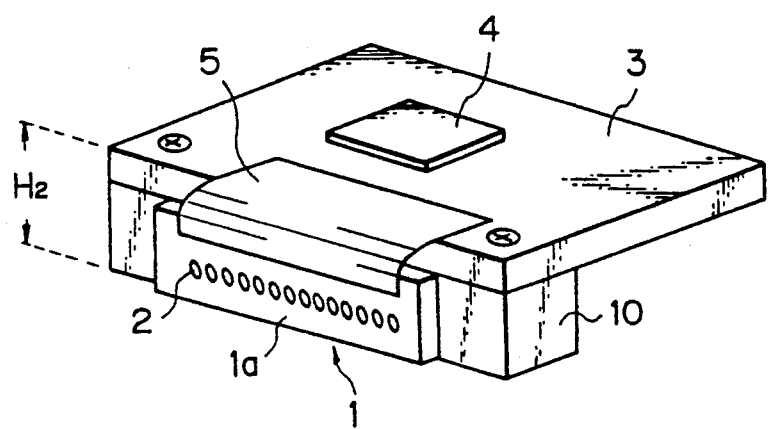
FIG. 2A is a perspective view of an image sensor module according to a second embodiment of the present invention.
Figure 2B:
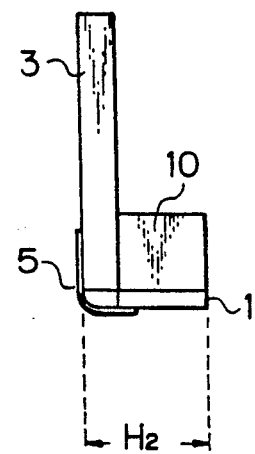
FIG. 2B is a cross-sectional view of an image sensor module shown in FIG. 2A.

FIG. 2A shows a perspective view of an image sensor module according to a second embodiment of the present invention, and FIG. 2B shows a cross-sectional view of the image sensor module. The same reference numerals as used in FIG. 1A are used for constituents which are similar to those in FIG. 1B, and thus descriptions thereof are left out.

In this embodiment, an image sensor device 1 and a PC board 3 are fixed on different surfaces from each other on a module substrate 10, and the image sensor device 1 is arranged perpendicular to the PC board 3. Using this image sensor module in an image input apparatus, the width $H_2$ of a portion which is touched to a document can be several millimeters which is slightly wider than that of the image sensor device 1. Therefore, the image sensor device 1 can be slid while being kept in contact with an uneven or bent surface of a document, to perform exact imaging of the document.

As is in the first embodiment shown in FIGS. 1A and 1B the image sensor device 1 is firmly fixed on the module substrate 10, so that warping of the image sensor device 1 is prevented, and the document is exactly read out.

Figure 3:
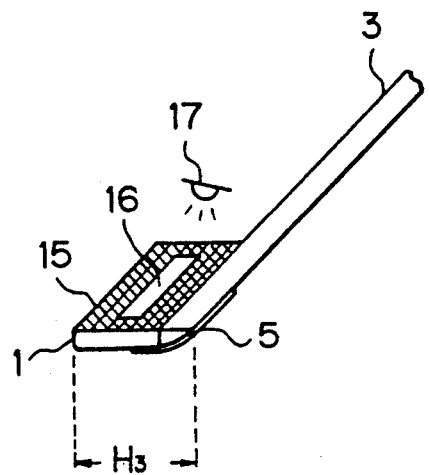
FIG. 3 is a cross-sectional view of an image sensor module according to a third embodiment of the present invention.

FIG. 3 shows a cross-sectional view of an image sensor module according to a third embodiment of the present invention. The same reference numerals as used in FIG. 1A are used for constituents which are similar to those in FIG. 1B, and thus descriptions thereof are left out.

This embodiment is similar to the second embodiment shown in FIG. 2A and 2B in that the image sensor device 1 and the PC board 3 are fixed on different surfaces of the module substrate 15, but is different from the second embodiment in that the image sensor device 1 and the PC board 3 are arranged at an angle of about 45°. This arrangement not only allows a width $H_3$ of the portion which is touched to the document to be sufficiently narrow, but also allows the image input apparatus to be easy to handle when the apparatus is held by hand. The portion, and a ray of light from a light emitting diode 17 is introduced through the aperture 16 onto the document.

Figure 4:
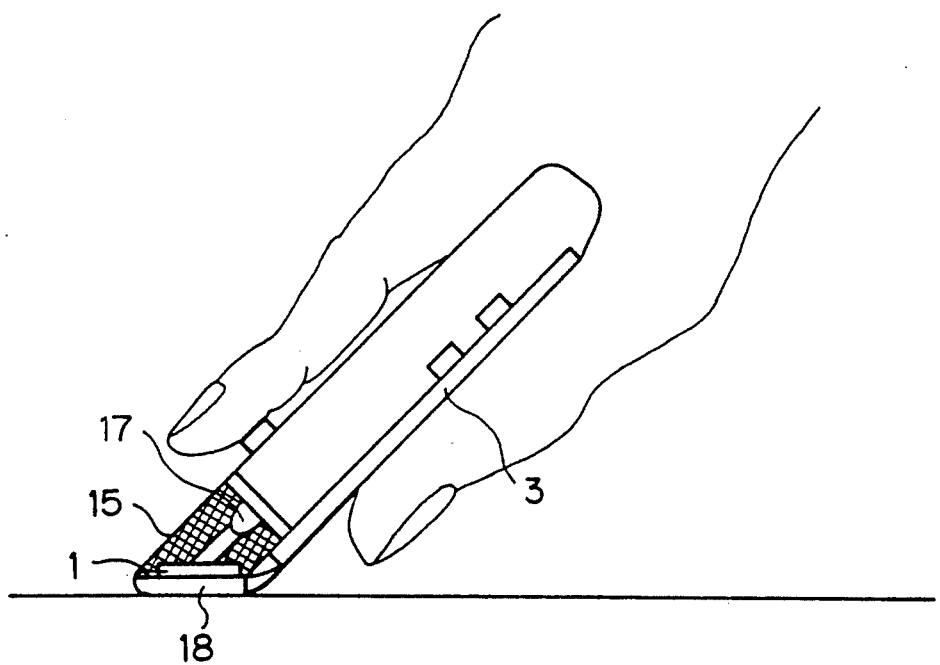
FIG. 4 is a cross-sectional view of an image input apparatus comprising the image sensor module shown in FIG. 3.

FIG. 4 is a cross-sectional view of an image input apparatus comprising the image sensor module shown in FIG. 3. In FIG. 4, a fiber array plate (FAP) 18 is provided under the image sensor device 1, in order to introduce light reflected from the document into the image sensor device 1. The FAP is so thin, for example, a thickness of a few millimeters, that an image input apparatus wherein the image sensor device 1 is closely in contact with a document can be constructed.

In this embodiment, the image sensor device 1 is also fixed on the module substrate 15, so that warping of the image sensor device 1 is also prevented so as to perform exact imaging of the document.

We claim:
1. An image sensor module, comprising:
an image sensor device for sensing an image of an object, having a plurality of sensor elements,
a control circuit for controlling the sensor elements,
a printed circuit board on which the control circuit is mounted,
a module substrate on which the image sensor device and the printed circuit board are fixed, and
connection means for electrically connecting the sensor elements with the control circuit, wherein
the image sensor device has a plurality of connection terminals, through which the sensor elements are electrically connected with the control circuit, only on one side of the image sensor device, and the opposite side of the image sensor device is flush with an edge portion of the module substrate, the image sensor device being fixed on a different surface of the module substrate from a surface on which the printed circuit board is fixed.

2. An image sensor module as claimed in claim 1, wherein the surface of the module substrate on which the image sensor device is fixed is substantially perpendicular to the surface of the module substrate on which the printed circuit board is fixed.

3. An image sensor module as claimed in claim 1, wherein the surface of the module substrate on which the image sensor device is fixed is inclined to the surface of the module substrate on which the printed circuit board is fixed.

4. An image sensor module, comprising:
a module substrate having first and second surfaces respectively formed in different planes, and an edge portion;
an image sensor device having a first side and a second side opposite said first side, said device including
a plurality of sensor elements disposed between said first side and said second side, and
a plurality of connection terminals, disposed only on said second side, said device being fixed on said first surface with said first side flush with said edge portion;
a printed circuit board fixed on said second surface;
a sensor elements control circuit mounted on said board; and
means for electrically connecting said control circuit to said sensor elements through said connection terminals.

5. An image sensor module according to claim 4, wherein said electrically connecting means includes an electrical connector disposed only on said second side of said device and said board.

6. An image sensor module according to claim 4, wherein said first surface is inclined to said second surface.

7. An image sensor module according to claim 4, wherein said first surface is substantially perpendicular to said second surface.

* * * * *

UNITED STATES PATENT AND TRADEMARK OFFICE
CERTIFICATE OF CORRECTION

PATENT NO.  :   5,218,462
DATED       :   Jun. 8, 1993
INVENTOR(S) :   Kitamura et al.

It is certified that error appears in the above-identified patent and that said Letters Patent is hereby corrected as shown below:

On the title page, Item [75]: "Koichi Kitamura; Hidenori Mimura; Kazuo Yamamoto; Yasumitsu Ohta" should read --Koichi Kitamura; Hidenori Mimura; Kazuo Yamamoto; Yasumitsu Ohta; and Kazuyoshi Sai--.

Signed and Sealed this

Eighth Day of March, 1994

Attest:

BRUCE LEHMAN

Attesting Officer

Commissioner of Patents and Trademarks